3,635,856
POLYVINYL CHLORIDE COMPOSITIONS
Akira Kaneko, Tadashi Ogino, and Yoshiyuki Hata, Fukushima, Japan, assignors to Kureha Kagaku Kogyo Kabushiki Kaisha, Tokyo, Japan
No Drawing. Continuation-in-part of abandoned application Ser. No. 637,368, May 10, 1967. This application Oct. 23, 1969, Ser. No. 868,932
Claims priority, application Japan, May 10, 1966, 41/29,508; Dec. 19, 1966, 41/83,137
Int. Cl. C08b 29/30; C08f 3/30, 45/58
U.S. Cl. 260—17.4                                      8 Claims

ABSTRACT OF THE DISCLOSURE

Non-toxic polyvinyl chloride compositions comprising a major portion of polyvinyl chloride containing a stabilizer composed of a mixture of (1) a polyhydric alcohol, (2) zinc, calcium and/or magnesium salts of a fatty acid, (3) an epoxidation product of a vegetable fat or oil, and (4) at least one additive selected from the group consisting of (a) a sucrose alkyl ester and (b) a semiester of an organic polybasic acid having at least one free carboxy group per molecule. Examples of suitable sucrose alkyl esters are the sucrose lauryl, myristyl and stearyl esters. Examples of suitable semiesters of polybasic organic acids are the monoesters of maleic, fumaric, itaconic, thiodiglycolic, thiodipropionic, diglycollic, citric, tartaric, malic and phthalic acids.

CROSS-REFERENCE TO RELATED APPLICATIONS

The present application is a continuation-in-part of application Ser. No. 637,368, filed May 10, 1967, now abandoned, claiming priority based on Japanese applications Ser. Nos. 29,508/66 and 83,137/66, filed May 10, 1966 and Dec. 19, 1966, respectively.

BACKGROUND OF THE INVENTION

(1) Field of the Invention

The present invention relates to improved polyvinyl chloride compositions having non-toxic properties. More particularly, the invention relates to molding compositions of the polyvinyl chloride system having improved thermal stability and to shaped bodies or articles made out of such compositions which exhibit improved transparency and good resistances against becoming cloudy or white-turbid after a time when moisture or water has been absorbed by incorporation into the composition of the polyvinyl chloride system of a polyhydric alcohol, an epoxidized vegetable fat or oil and at least one compound selected from the group consisting of zinc salts of fatty acids, calcium salts of fatty acids and magnesium salts of fatty acids.

(2) Discussion of the prior art

It has previously been known that a stabilizing agent comprising a polyhydric alcohol, at least one compound selected from the group consisting of zinc salts of fatty acid, calcium salts of fatty acid and magnesium salts of fatty acid, and an epoxidized vegetable fat or oil, the latter being the minor ingredient, is suitable for use as a non-toxic stabilizer for a composition of the polyvinyl chloride system (hereinafter such a composition is simply designated as a PVC composition). However, it has disadvantages in many instances because of its very poor thermal stability which makes it difficult to work or mold the foregoing PVC composition into a shaped body or article. In addition to this, in a shaped body or article resulting from working or molding process, the transparency thereof, which is one of the characteristics of PVC in itself, is reduced. Moreover, the aforesaid body or article becomes devitrified after the lapse of time or becomes white-turbid after a time when moisture or water is absorbed. This results in spoiling the external appearance thereof. In spite of a great many applications in industry, as in the field of packaging foodstuffs or goods, therefore, the range of its use is restricted owing to the defects encountered in the case of working or molding the PVC composition and, for example, unfavorable variations in external appearance during the course of storage.

In the case of producing a shaped body or article by molding a PVC composition containing the foregoing non-toxic stabilizer which is of practical use, furthermore, the use of said stabilizer is not preferred because the PVC composition is far inferior, with respect to thermal stability, to a PVC composition containing a stabilizer of an organic tin compound system which is generally used at present. The body or articles made of the former PVC composition deteriorated to a great extent with yellow coloring over the surface area thereof even immediately after formation. It also becomes very difficult to continue working or molding the instant PVC composition into a shaped body or article over a long period of time, and this causes the production or formation of said shaped body or article to be expensive.

SUMMARY OF THE INVENTION

It is a primary object of this invention to provide PVC compositions or blends which are capable of being favorably molded owing to their improved thermal stability making them resistant to the elevated temperatures applied thereto during molding into a shaped body or article which exhibits a high degree of transparency and good appearance and is free from cloudiness or turbidity even after the lapse of a long space of time, by incorporating a sucrose alkyl ester into the non-toxic stabilizer composed of a mixture of a polyhydric alcohol, at least one compound selected from the group consisting of zinc, calcium and magnesium salts of a fatty acid, and a small amount of other additive(s) such as the epoxidation products of vegetable fat and oil, and by blending the stabilizer thus obtained with a PVC composition or a polymer composed mainly of vinyl chloride.

Although a non-toxic stabilizer comprising zinc, calcium and/or magnesium salts of a fatty acid, a polyhydric alcohol as a major component and a small amount of an epoxidized vegetable fat and oil, will produce a shaped body or article of considerable transparency when it is sufficiently blended with a PVC composition on a laboratory scale, there cannot be produced, strange to say, a shaped body or article of good transparency when a PVC composition containing the foregoing stabilizer is processed on an industrial scale while employing an extruding machine, injection molding apparatus, etc.

As for the difficultly encountered in the foregoing industrially scaled working, some explanations may be offered. Metal (Zn, Ca and Mg) salts of fatty acids melt at temperatures of 120–160° C. and melting points of polyhydric alcohols, such as, sorbitol, mannitol, pentaerythritol and the like, which are of poor compatibility, are as high as 130–260° C., so that no eutectic mixture of the former and the latter is produced and the crystalline materials are mixed with each other without fusing. Although the firegoing additives including the stabilizer can be blended and kneaded finely and closely on a laboratory scale with a PVC composition, even if the amount of the former is very small when compared with that of the latter, it is difficult to intimately mix them in the case of industrial processing employing a production machine of large dimensions because it is only for a very short time that the powdery mass is exposed to a sufficiently elevated temperature to melt or fuse the foregoing high melting ingredients. The low fluidity of the powdery mass described above may serve to make the dispersion of the solid stabilizer over the entire body of the powdery mass insufficient. Thereby the transparency of the final product is reduced and said product has a tendency to becoming cloudy with the passage of time and to exhibit white turbidity upon absorbing moisture or water, which results in a worsening of the external appearance thereof.

The aforesaid sucrose alkyl esters, to be used in accordance with this invention, appear to serve to impart a considerable degree of thermal stability to a PVC composition to be subjected to an elevated temperature during working. Therefore, the transparency of the final product is improved to a great extent, so far as they are added together with a stabilizer composed of a mixture of said metal salt(s), polyhydric alcohol and the like to the PVC composition. The reason why the foregoing sucrose alkyl esters are useful for the purpose intended, namely, for the production of shaped bodies or articles having improved transparency and free from becoming cloudy with the lapse of time, will be considered as follows. They lower the melting points of polyhydric alchols by the formation of eutectic mixtures therewith and serve to make said metal salts of fatty acid readily dispersible within and over the entire body of a PVC composition during the course of blending or kneading by means of a working machine by virtue of its activity as a surface active agent, so that there is yielded an intimate and homogeneous PVC blend or composition which is capable of being easily worked.

Prior to this invention, it has been believed that the use of sucrose alkyl esters was not desired be cause they would cause the thermal stability of the PVC composition to be lower and would lead to dark brownish coloring thereof at an early stage. On the contrary, we have found that a PVC composition containing a non-toxic stabilized, which is of poor thermal stability, is greatly improved with respect to its thermal stability by the incorporation of sucrose alkyl esters. It seems most reasonable to conclude that the synergistic effect exhibited by both the stabilizer and the esters could scarcely be anticipated by any one other than us. The invention and the novelty thereof are based on the facts hereinabove described.

It is a second object of this invention to provide PVC blends or compositions which are capable of being continuously worked or molded over a long space of time into a shaped body or article which is free from coloring in the early stage, after the completion of shaping, and exhibits good transparency not injured to any extent, by adding one or more semiesters of an organic polybasic acid having one free carboxyl group per molecule to a stabilized PVC blend or composition rendered nontoxic and comprising a PVC comportion and a stabilizing or salts of fatty acids, one or more polyhydric alcohols and a small amount of epoxidized vegetable fat or oil.

In the case where a PVC composition containing a nontoxic stabilizing agent consisting of a metal salt or salts (Ca, Zn and/or Mg salts) of a fatty acid, one or more polyhydric alcohols, and an epoxidized vegetable fat or oil, the latter being the minor ingredient, is subjected to practical molding, the shaped body produced no longer is of very little commercial value owing to its very bad external appearance caused by the yellow coloring thereof in the early stage after molding.

In the case where a PVC composition containing the aforesaid non-toxic stabilizing agent, into which a small amount of one or more semiesters of organic acid is further incorporated, is worked or molded on a practical scale, on the other hand, there is produced a shaped body or article having good transparency and nearly free from the yellow coloring which would be observed in early stages, if the foregoing esters had not been added. In addition to this, esters resulting from the complete esterification of an organic acid have hardly proved to be effective to prevent the shaped body from being colored in the early stage after molding. In the case of a polybasic organic ester which is not esterified at all, furthermore, it has been found that the shaped body undergoes the initial coloring to a greater extent after molding, with the result that a very bad external appearance, reddish-orange in color, is produced.

The aforesaid effectiveness to lower the degree of initial coloring of a shaped body and to increase the workability of a PVC composition, which is attained by the combination of a non-toxic stabilizer with one or more semiesters of an organic acid, may be attributed to the increment in the stabilizing power of the stabilizer as a result of a synergistic effect between the former and the latter. Therefore, it may be reasonable to conclude that the foregoing multiple-effect, which is the second characteristic of this invention, would not be obvious from the facts that fully esterified organic acids or polybasic organic acids have been used according to the prior art methods.

The proportion of sucrose ester to be used in accordance with this invention is as follows. To 100 parts by weight of a polyvinyl chloride or a polymer (blend) composed mainly of vinyl chloride, there are mixed from about 0.5–6.0 parts by weight of an admixture composed of a metal salt or salts (Zn, Ca and/or Mg salt) of a fatty acid and one or more polyhydric alcohols, which is the main component of the non-toxic stabilizer, from about 0.5 to 15 parts by weight of epoxidized vegetable fat and/or oil, and from about 0.02 to 1 part by weight of sucrose alkyl ester(s). The admixture of metal salts and alcohols are usually present, separately, in amounts of from 0.02 to 1.0 parts of the polyhydric alcohol and 0.2 to 5.0 parts of the metal salt. With the aforementioned sucrose alkyl ester(s) or instead of it, a semiester of a polybasic organic acid is used. That is, sucrose alkyl ester(s) and semiester(s) of polybasic organic acid can be used either in combination or separately. The amount of semiester(s) of said polybasic organic acid is from about 0.05 to 10 parts by weight on the basis of 100 parts of the polymer. The typical non-toxic stabilizer is an admixture of pure metal salt(s) of a fatty acid and pure polyhydric alcohol(s), but it may include, for example, a blend stabilizer composed of these metal salts of fatty acids and polyhydric alcohols as a major component, and other additives such as non-toxic metallic soaps, plasticizers, antioxidants and the like. The sucrose alkyl esters may be those having an hydrophile-lipophile balance value (HLB) below 6.0 and include monoesters or diesters of fatty acids having an alkyl group with 12 to 18 carbon atoms and mixtures thereof. As the sucrose alkyl ester, there are exemplified sucrose lauryl ester, sucrose myristyl ester, sucrose stearyl ester and the like. These sucrose alkyl esters in a broader sense exhibit a considerable degree of effectiveness when used in a proportion greater than 0.02 part by weight, in accordance with this invention. However, the use of sucrose alkyl esters exceeding 1 part by weight is not preferred because the thermal stability of a PVC is decreased.

As for the semiesters of organic acids, there may be used, for example, monoesters of dibasic organic fatty acid having the general formula:

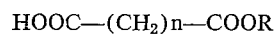

... (A), wherein $n$ is an integer from 1 to 8 and R is an alkyl or aryl group with from 1 to 18 carbon atoms. The semiesters of the polybasic acids may be exemplified by the general formula HOOC—X—(COOY)$_m$ ... (B), wherein X is an alkylene or arylene group with 1 to 8 carbon atoms, said alkylene or arylene group being capable of carrying one or more double bonds, hydroxyl groups, halogens, sulfur atoms, and other substituents, Y is an alkyl or aryl group with 1 to 18 carbon atoms, and $m$ is an integer from 1 to 3. The general Formula B coincides with the general Formula A, when X, Y and $m$ are $(CH_2)_n$, R and 1, respectively, in the order described. Typical semiesters of organic acid described above may include, for example, maleic acid monoester, fumaric acid monoester, itaconic acid monoester, thioglycollic acid monoester, thiodipropionic acid monoester, diglycollic acid monoester, citric acid diester, tartaric acid monoester, malic acid monoester, phthalic acid monoester, etc. These semiesters of polybasic organic acids in a broader sense possess one unesterified acid group in every molecule, and exhibit a remarkable effect when added in a proportion greater than 0.05% by weight to 100 parts of PVC. Although there is no upper limit as to the amount of the aforesaid semiester(s) to be used, namely, they may be used in the proportion of about 10 parts by weight without any trouble, the use thereof in the proportion higher than 5 parts by weight is not preferred owing to its relatively lower solubility with a PVC composition which causes the transparency of a shaped body or article to be lower. If they are used in combination with a plasticizer which is of good solubility with the PVC, such as diesters and the like, they are favorably used for the production of a shaped body or article of good transparency even in a proportion higher than 5 parts by weight, without lowering the transparency thereof.

Moreover, both the sucrose alkyl esters and the semiesters of polybasic organic acid are suitably incorporated into a PVC composition in the form of a pre-mixture thereof with metal salts of fatty acid, polyhydric alcohol(s) and epoxidation products of vegetable fat or oil, but the usefulness of this invention will not be reduced at all if they incorporate thereinto separately from the foregoing metal salt(s) of fatty acid, polyhydric alcohol(s) and epoxidation of vegetable fat or oil.

PVC blends or compositions produced in accordance with this invention are favorably worked or molded without any subsequent processing into a shaped body or article of good transparency by means of the so-called powder extrusion process in which they are fed into an extrusion or injection molding machine or subjected to calendering. Advantages of the foregoing compositions are also brought into full play even in so-called pellet extrusion processes which require the employment of preliminary working apparatus before the processing by means of molding.

DESCRIPTION OF THE PREFERRED EMBODIMENTS

This invention will now be more closely illustrated by the following examples.

Example I

PVC compositions having the proportions in parts by weight as shown in Table 1 and having polymerization degree of 700 and other components were mixed by a blender of the vane type at 80° C. for 2 hours, and the resulting blended masses were extruded by an extrusion machine of the screw type, equipped with T-shaped die, into a sheet 1 mm. in thickness.

A number of sheets produced by the foregoing process were heated to 175° C. in a Geer's oven to determine the space of time required to make them thermally discolored into brownish black, said space of time being designated as the thermal stability lasting time. The transquency thereof was expressed in the terms of the percent transmittance for all light and the degree of cloudiness in percent. The tendency towards becoming white-turbid, with the lapse of time, was measured in this manner. A sheet was left to stand for 48 hours in an air-conditioned chamber kept at 40° C. and 85% (R.H.), and the transparency thereof, expressed in the terms of percent transmittance for all light and the degree of cloudiness in percent was obtained, for comparison with the samples before treatment. The data listed in Table 1, with the exception of case No. A-1, are those of compositions containing sucrose alkyl esters added in accordance with this invention, and show improvements in or relating to thermal stability, transparency and durability or lasting ability thereof after the absorbtion of moisture or water, and external appearance.

TABLE 1

| Components and properties of products | Sample Number | | | |
|---|---|---|---|---|
| | A-1 | A-2 | A-3 | A-4 |
| PVC ($\bar{P}^*$:700) | 100 | 100 | 100 | 100 |
| Zinc stearate | 0.3 | 0.3 | 0.3 | 0.3 |
| Calcium stearate | 0.5 | 0.5 | 0.5 | 0.5 |
| Epoxidized soyabean oil (epoxy group: 6%) | 8.0 | 8.0 | 8.0 | 8.0 |
| Sorbitol | 0.5 | 0.5 | 0.5 | 0.5 |
| Sucrose ester: | | | | |
|   Lauryl ester | | 0.05 | | |
|   Stearyl ester | | | 0.05 | 0.10 |
| Thermal stability lasting time (in min., at 157° C.) | 75 | 90 | 90 | 105 |
| Transparency of product (Immediately after molding): | | | | |
|   (1) Percent transmittance for all light (tp. percent) | 75.4 | 76.8 | 77.2 | 78.2 |
|   (2) Degree of cloudiness (H, percent) | 17.1 | 6.0 | 5.6 | 5.9 |
| Transparency of product (After absorbing moisture or water): | | | | |
|   (1) Percent transmittance for all the lights (tp. percent) | 63.2 | 74.6 | 76.9 | 77.2 |
|   (2) Degree of cloud (H, percent) | 31.8 | 7.6 | 6.1 | 6.3 |

*$\bar{P}$ = Polymerization degree.

Example II

In accordance with the blending of compositions in parts by weight, as shown in Table 2, each composition was shaped into a transparent tubing 1 inch in diameter by means of an extrusion machine of the screw type, after being treated with a Henschel mixer at 100° C. for 15 minutes.

Tubing of the compositions B-1 and B-2 became half turbid over the entire body thereof with the formation of white-colored, infusible and solid mass dispersed with said body, whereas tubing of compositions B-3 and B-4 proved good from the viewpoint of transparency. Tubing of the compositions B-1 through B-4 were immersed in warm water at 60° C. for 1 hour, to detect variations in transparency thereof, and there was observed little phenomenon of becoming white-turbid with the cases of B-3 and B-4 carrying sucrose alkyl esters incorporated thereinto.

TABLE 2

| | Sample Number | | | |
|---|---|---|---|---|
| | B-1 | B-2 | B-3 | B-4 |
| PVC ($\bar{P}$:1000) | 100 | 100 | 100 | 100 |
| 1. Zinc stearate | 1 | 1 | 1 | 1 |
| 2. Calcium stearate | 3 | 3 | 3 | 3 |
| 3. Magnesium stearate | 0.5 | 0.5 | 0.5 | 0.5 |
| 4. Mono-iso-butyl adipate | 0.5 | 0.5 | 0.5 | 0.5 |
| 5. Pentaerythritol | 0.3 | 0.2 | 0.3 | 0.2 |
| 6. Sorbitol | | 0.1 | | 0.1 |
| 7. Sucrose myristyl ester | | | 0.1 | 0.1 |
| 8. Epoxidized soyabean oil | 1.5 | 1.5 | 1.5 | 1.5 |
| Temperature range of melting point of a mixture comprising components 1 through 7 (°C.) | 63–270 | 62–270 | 62–150 | 62–143 |

Example III

Composition C:                           Parts by weight

PVC ($\bar{P}$: 800) _____ 100
    Calcium stearate _____ 0.1
    Zinc stearate _____ 0.4
    Mannitol _____ 0.5
    Paraplex G-62 (A commercially available epoxidized vegetable oil; epoxy value: 6.0) __ 5.0
    Organic acid or ester thereof shown in Tables 3, 4 _____ 0–1.0

A blend of Composition C was worked into a ribbon of from 0.5 to 0.8 mm. in thickness by means of two rollers at 145° C. after mastication. The ribbon was folded up, and the folded up ribbon was pressed into a sheet 3 mm. in thickness at 185° C., and under pressure of 100 kg. sq. cm. by means of a hot pressing device, to measure the degree of coloration and the transparency.

TABLE 3

| Organic acid or ester thereof | Amount used in parts by weight | Degree of coloration | Transparency | Tp, percent | H, percent |
|---|---|---|---|---|---|
| 3-1..... None...................... | 0 | Yellow......... | Good.......... | 72 | 8 |
| 3-2..... Malonic acid................ | 0.5 | Reddish-orange. | Slightly turbid.. | 65 | 16 |
| 3-3..... Malonic acid monobutyl ester... | 0.5 | Colorless........ | Good.......... | 74 | 6 |
| 3-4..... Malonic acid dibutyl ester..... | 0.5 | Yellow.......... | ....do.......... | 72 | 7 |
| 3-5..... Adipic acid.................. | 0 | Reddish-brown. | Half turbid..... | 64 | 18 |
| 3-6..... Adipic acid monooctyl ester.... | 0.5 | Colorless........ | Good.......... | 76 | 4 |
| 3-7..... Adipic acid dioctyl ester...... | 0.5 | Yellow.......... | ....do.......... | 72 | 6 |
| 3-8..... Adipic acid monobutyl ester.... | 0.5 | Colorless........ | ....do.......... | 78 | 4 |
| 3-9..... Adipic acid dibutyl ester...... | 0.5 | Yellow.......... | ....do.......... | 72 | 9 |
| 3-10.... Sebacic acid................. | 0.5 | Reddish-orange. | Half turbid..... | 62 | 19 |
| 3-11.... ...do....................... | 0.5 | Colorless........ | Good.......... | 74 | 5 |
| 3-12.... Sebacic acid dibutyl ester..... | 0.5 | Yellow.......... | ....do.......... | 72 | 6 |

A ribbon resulting, after mastication, was molded under pressure, as in the case of the Composition C, into a sheet 3 mm. in thickness, and the initial coloring and the transparency thereof were measured. The results are shown in Table 4.

As will be clearly understood from Tables 3 and 4, compositions containing semiester compounds of an organic acid in accordance with this invention, viz, Samples 3-3, 3-6, 3-8, 3-11, 4-3, 4-6, 4-7 and 4-10, are capable of providing a shaped body or article of good transparency and free from coloring in the early stage after molding. Compositions 3-1, 3-6 (Table 3) and 4-7 (Table 4) were worked up into a shape of cylindrical configuration and of the dimensions (25 mm. in inner diameter, 3 mm. in wall thickness and 31 mm. in outer diameter) by means of an extrusion machine of the screw type, after being blended by a ribbon blender at 80° C. for 2 hours, to produce a yellow colored and half turbid tubing (3-1), and colorless and transparent tubings (3-6 and 4-7) were capable of being continuously extruded for eight consecutive hours with little decomposition of the constituents, whereas the composition (3-1) was partially decomposed upon the continuous operation of working for four hours with the formation of black colored decomposition products.

TABLE 4

| Organic acid and ester thereof | Amount used in part by weight | Initial coloring | Transparency | Tr, percent | H, percent |
|---|---|---|---|---|---|
| 3-1.... None........................ | 0 | Yellow......... | Good.......... | 72 | 8 |
| 4-1.... Maleic acid.................. | 0.2 | Reddish-brown. | Semitransparent.. | 58 | 12 |
| 4-2.... Maleic anhydride............. | 0.2 | Orange-yellow..... | ....do.......... | 60 | 18 |
| 4-3.... Maleic acid monomethyl ester... | 0.2 | Colorless........ | Good.......... | 74 | 6 |
|  | 0.5 | ....do.......... | ....do.......... | 73 | 5 |
| 4-4.... Maleic acid dimethyl ester..... | 0.2 | Yellow.......... | ....do.......... | 72 | 7 |
|  | 0.5 | ....do.......... | ....do.......... | 71 | 8 |
| 4-5.... Fumaric acid................. | 0.1 | Reddish-orange. | Semitransparent.. | 58 | 12 |
| 4-6.... Fumaric acid monobutyl ester... | 0.1 | Colorless........ | Good.......... | 73 | 6 |
| 4-7.... Fumaric acid monooctyl ester... | 0.1 | ....do.......... | ....do.......... | 72 | 5 |
| 4-8.... Fumaric acid dioctyl ester..... | 0.1 | Yellow.......... | Good.......... | 70 | 7 |
| 4-9.... Itaconic acid................. | 0.5 | Reddish-orange. | Semitransparent.. | 68 | 13 |
| 4-10... Itaconic acid monobutyl ester... | 0.5 | Colorless........ | Good.......... | 74 | 6 |
| 4-11... Itaconic acid dibutyl ester..... | 0.5 | Yellow.......... | Good.......... | 71 | 3 |

Example IV

Composition D: Parts by weight
- PVC ($\bar{P}$:1000) _____ 100
- Zinc stearate _____ 0.8
- Calcium stearate _____ 0.2
- Magnesium stearate _____ 0.2
- Mannitol _____ 0.8
- Trinonylphenyl phosphite _____ 0.5
- Epoxidized linseed oil (epoxy value: 9%) ___ 7.0
- Butyl phthalyl butyl glycolate _____ 15.0
- Polybasic organic acid or ester thereof shown in Table 5 _____ (0–3.0)

A number of mixtures of the composition D were blended with or without various kinds of esters by Henschel's mixer at 120° C., for 30 minutes, pressure molded into a sheet 3 mm. in thickness, after mastication and the formation of ribbons, as in Example I. They were also shaped into a film of from 0.1 to 0.2 mm. in thickness by means of an extrusion machine of the screw type, while using the inflation process. The results obtained are shown in Table 5.

TABLE 5

| Organic acid and ester thereof | Amount used in parts by weight | Initial coloring of press-shaped sheet | Film extruded Initial coloring | Extrusion property |
|---|---|---|---|---|
| 5-1.... None........................ | 0 | Yellow......... | Yellow......... | Good. |
| 5-2.... Diglycollic acid............... | 0.2 | Reddish-orange.............. | Reddish-orange......... | Slightly bad. |
| 5-3.... Diglycollic acid monobutyl ester.... | 0.2 | Very slightly yellow........... | Very slightly yellow... | Good. |
| 5-4.... Thiodipropionic acid............ | 0.2 | Reddish-orange.............. | Reddish-orange......... | Slightly bad. |
| 5-5.... Thiodipropionic acid monolauryl ester.. | 0.2 | Very slightly yellow........... | Very slightly yellow... | Good. |
|  | 3.0 | Very slightly yellow (colorless).......... | ....do............ | Do. |
| 5-6.... Tartaric acid.................. | 0.5 | Dark red............. |  |  |
| 5-7.... Tartaric acid monoethyl ester..... | 0.5 | Very slightly yellow........... |  |  |
| 5-8.... Thioglycollic acid.............. | 0.5 | Reddish-orange................ |  |  |
| 5-9.... Thioglycollic acid monobutyl ester... | 0.5 | Very slightly yellow............ |  |  |
| 5-10... Malic acid.................... | 0.3 | Reddish-orange................ |  |  |
| 5-11... Malic acid monobutyl ester...... | 0.3 | Very slightly yellow............ |  |  |
| 5-12... Adipic acid monophenyl ester.... | 0.3 | Very and very slightly yellow (almost colorless).. | Very slightly yellow... | Good. |
| 5-13... Adipic acid monostearyl ester.... | 0.5 | Very and very slightly yellow............. | ....do............ | Do. |
| 5-14... Malonic acid monostearyl ester... | 0.5 | ....do....................... |  |  |

As can be seen from compositions 5–3, 5–5, 5–7, 5–9, 5–11, 5–12, 5–13, and 5–14 listed in Table 5, it may reasonably be concluded that the use of semiester(s) of polybasic organic acid is effective to lower the degree of coloring of the PVC compositions in the early stage and to give a superior external appearance thereto.

Example V

| Composition E: | Parts by weight |
|---|---|
| PVC (P̄:700) | 100 |
| Zinc stearate | 0.3 |
| Calcium stearate | 0.1 |
| Mannitol | 0.3 |
| Epoxidation compound [1] | 7.0 |
| 2,6-ditert-butyl-4-methylphenol | 0.2 |
| Acryloid KM227 [2] | 10.0 |
| Organic acid and ester thereof shown in Table 6 (see Table 6) | 0–2.0 |

[1] Paraplex G–62 (a commercially available epoxidized vegetable oil; epoxy value: 6.0).
[2] Acryloid KM 227 (a commercially available acrylic material).

A number of mixtures of the composition E were treated with a ribbon blender at 80° C., for 3 hours to produce a mastication sheet which was either folded under pressure into a lamination or extruded into an extrusion sheet 0.3 mm. in thickness while using a T-figured die. Data obtained from the resulting sheets are listed in Table 6.

As can be clearly seen from Table 7, the addition of sebacic acid monobutyl ester brings good results with respect to the initial color of the PVC composition.

Example VII

To 100 parts by weight of a copolymer comprising 98% by weight of vinyl chloride and 2% by weight of cetyl-vinyl ether and having a polymerization degree of 700, various kinds of additives listed in Table 8 were added. The resulting blended masses were treated with a blender of the vane type at 80° C. for 2 hours, and extruded by an extrusion machine of the screw type into a shape of cylindrical configuration. The shapes thus obtained were blown into bottles in blow molds of the divided type. In addition to this, the foregoing masses were blended between two rollers at 140° C. for 3 minutes, and were shaped into sheets and left to stand within a Geer's oven at 170° C. until they became black in color, which length of time was measured. After shaping said masses into sheets by means of rollers, furthermore, lengths of the resulting sheets were piled up one upon another to produce various laminations to be pressed at 200° C. for 5 minutes into those 1.5 mm. in thickness. The laminates thus obtained were left to stand within an airconditioned chamber kept at 40° C. and 85% (R.H.) for 50 hours, to measure variations in transparency. Separately, the aforesaid bottles were charged with water and allowed to stand at room temperature for 1 month to observe changes in external appearance.

TABLE 6

| Organic acid and ester thereof | Amount added, parts by weight | Initial coloring of a laminate formed by pressing | T-figured extrusion property | Die extrusion tone of a sheet |
|---|---|---|---|---|
| None | 0 | Yellow | Good | Yellow. |
| Phthalic acid | 0.5 | Reddish-brown | Bad | Reddish-brown. |
| Phthalic acid monooctyl ester | 1.0 | Colorless | Good | Colorless. |
| do | 2.0 | do | do | Do. |
| Phthalic acid dioctyl ester | 1.0 | Slightly yellow | do | Slightly yellow. |
| do | 2.0 | do | do | Do. |
| Phthalic acid monobutyl ester | 1.0 | Colorless | do | Colorless. |
| Phthalic acid dibutyl ester | 1.0 | Slightly yellow | do | Slightly yellow. |
| Fumaric acid monooctyl ester | 1.0 | Colorless | do | Colorless. |
| Fumaric acid dioctyl ester | 1.0 | Slightly yellow | do | Slightly yellow. |
| Fumaric acid monobutyl ester plus fumaric acid dibutyl ester | a 1.0 | Colorless | do | Colorless. | a Equivalent amount.

Table 6 shows the fact that the incorporation of semiester(s) of organic acid into a PVC composition makes easy the production or molding of a sheet or laminate which is resistive to a great extent against discoloring. It is also clear that the fact that the completely esterified compounds of organic acids, such as phthalic acid dioctyl ester (DOP), phthalic acid dibutyl ester (DEP), etc., are scarcely effective to reduce the tendency towards discoloring in the early stage after molding.

Example VI

To 100 parts by weight of PVC (P:800), various kinds of additives are added in the proportions shown in the following table in parts by weight. The resulting blended masses were shaped under pressure after mastication, as in Example III, into a sheet 3 mm. in thickness to be subjected to resting for initial discoloration.

TABLE 7

| | 1 | 2 | 3 | 4 | 5 | 6 | 7 |
|---|---|---|---|---|---|---|---|
| Zinc stearate | 0.5 | 0.5 | 0.5 | 0.5 | 0.5 | 0.5 | 0.3 |
| Calcium stearate | 0.1 | 0.1 | 0.1 | 0.1 | 0.5 | 0.5 | 0.4 |
| Epoxidized soyabean oil | 0 | 0 | 5.0 | 5.0 | 0 | 0 | 0 |
| Mannitol | 0.6 | 0.6 | 0.6 | 0.6 | 0.6 | 0.6 | 0.6 |
| Sebacic acid monobutyl ester | 0 | 0.3 | 0 | 0.3 | 0 | 0.3 | 0.3 |
| Initial color | (1) | (2) | (1) | (2) | (3) | (4) | (4) |

[1] Yellow. [2] Colorless, [3] Deep yellow. [4] Very slightly yellow.

TABLE 8

| | Sample number | | | |
|---|---|---|---|---|
| | F-1 | F-2 | F-3 | F-4 |
| Zinc stearate | 0.5 | 0.5 | 0.5 | 0.5 |
| Calcium stearate | 0.3 | 0.3 | 0.3 | 0.3 |
| Trinonylphenylphosphite | 0.3 | 0.3 | 0.3 | 0.3 |
| Ionol | 0.1 | 0.1 | 0.1 | 0.1 |
| Mannitol | 0.3 | 0.2 | 0.25 | 0.2 |
| Sorbitol | | 0.1 | | 0.05 |
| Sucrose stearyl ester | | | 0.05 | 0.05 |
| Epoxidized soyabean oil (epoxy group cont. 6.5%) | 4.0 | 4.0 | 4.0 | 4.0 |
| Sebacic acid monobutyl ester | 0.3 | 0.3 | 0.3 | 0.3 |
| External appearance of a bottle immediately after molding | (1) | (1) | (1) | (1) |
| External appearance of a bottle with the lapse of time of 24 hours after molding | (2) | (3) | (4) | (4) |
| External appearance of a bottle one month after being charged with water | (5) | (5) | (5) | (5) |
| Discoloring time in Geer's oven at 170° C. (minutes) | 90 | 90 | 105 | 120 |
| Transparency of a sheet immediately after pressing percent transparency for all the light (Tp, percent) | 74.8 | 75.2 | 76.0 | 77.0 |
| Percent degree of turbidness (H, percent) | 6.5 | 5.3 | 4.8 | 3.7 |
| After absorbing moisture or water | 6.5 | 5.3 | 4.8 | 3.7 |
| Percent transparency for all light, percent | 68.2 | 64.3 | 74.3 | 76.2 |
| Percent degree of turbidness, percent | 14.0 | 12.0 | 5.2 | 4.0 |

[1] Colorless, transparent. [2] Semi-transparent. [3] Slightly cloudy. [4] Transparent. [5] White-turbid, opaque.

Bottles of the compositions F–1 and F–2 proved to have a tendency to devitrify at the time when left to stand, with no water charged therein, at the room temperature the lapse of time of one month after being charged with water as the result of losing their transparency. Shaped bodies of the compositions F-3 and F-4 were capable of maintaining good external appearance with a very little decrease in transparency, which proved the fact that the effectiveness of the sucrose ester and semiester of polybasic organic acid were brought into play.

Having now particularly described and ascertained the nature of our said invention and in what manner the same is to be performed, we declare that what is claimed is:

1. A non-toxic composition of polyvinylchloride, comprising in parts by weight, (A) a mixture of (a) 100 parts of a material consisting essentially of polyvinyl chloride, (b) 0.02 to 1.0 parts of at least one polyhydric alcohol, (c) 0.20 to 5.0 parts of at least one compound selected from the group consisting of zinc, calcium and magnesium salts of fatty acids, and (d) 0.5 to 15 parts of a material selected from the group consisting of epoxidized vegetable fats and oils, and (B) at least one material selected from the group consisting of 0.02 to 1.0 parts of a sucrose alkyl ester having a hydrophilelipophile balance value below 6.0 and being from the group consisting of monoesters and diesters of fatty acids having an alkyl group with 12 to 18 carbon atoms and mixtures thereof and 0.05 to 10 parts of a polybasic organic acid semiester containing one free carboxyl group per molecule and being represented by the general formula:

$$HOOC-X-(COOY)_m$$

wherein X is an alkylene or arylene group with 1 to 8 carbon atoms, said alkylene or arylene group being capable of carrying at least one double bond, hydroxyl group, halogen or sulfur atom, Y is an alkyl or aryl group with 118 carbon atoms, and $m$ is an integer from 1 to 3.

2. The non-toxic polyvinyl chloride composition of claim 1, wherein (B) is said sucrose alkyl ester.

3. The non-toxic polyvinyl chloride composition of claim 1, wherein component B is said polybasic organic acid.

4. The non-toxic polyvinyl chloride composition of claim 2, wherein the sucrose alkyl ester is selected from the group consisting of mono- and di-esters of fatty acids having an alkyl group containing from 12 to 18 carbon atoms in the chain.

5. The non-toxic polyvinyl chloride composition of claim 3, wherein the polybasic organic acid is selected from the group consisting of semiesters of di-, tri-, and tetrabasic organic acids having one carboxyl group remaining still unreacted, and being represented by the general formula:

$$HOOC-(X)-(COOY)_m$$

in which X is a member selected from the group consisting of alkylene and arylene groups containing from 1 to 8 carbon atoms in the chain, Y is a member selected from the group consisting of alkyl and aryl groups containing from 1 to 18 carbon atoms in the chain and $m$ is an integer from 1 to 3.

6. The non-toxic polyvinyl chloride composition of claim 1, wherein said X member is substituted by at least one group selected from the group consisting of $OH^-$ and a halogen atom.

7. The non-toxic polyvinyl chloride composition of claim 5, wherein said X group contains at least one double bond.

8. The non-toxic polyvinyl chloride composition of claim 1, wherein said X group contains at least one sulfur atom.

References Cited

UNITED STATES PATENTS

| Re. 25,451 | 10/1963 | Hecker et al. | 260—23 |
|---|---|---|---|
| 2,457,035 | 12/1948 | Darby. | |
| 2,711,401 | 6/1955 | Lally. | |
| 2,893,990 | 7/1959 | Hass et al. | |
| 3,003,999 | 10/1961 | Kander et al. | |
| 3,321,423 | 5/1967 | Scullin et al. | |
| 3,346,536 | 10/1967 | Kander et al. | |
| 3,347,823 | 10/1967 | Buckley et al. | |
| 3,362,923 | 1/1968 | Knuth. | |
| 3,396,132 | 8/1968 | Perry et al. | |
| 3,495,998 | 2/1970 | Reeves et al. | 106—176 |

FOREIGN PATENTS 606,379  10/1960  Canada.

WILLIAM H. SHORT, Primary Examiner

R. J. KOCH, Assistant Examiner

U.S. Cl. X.R.

260—23 XA, 45.85, 92.8 R